Patented Feb. 8, 1938

2,107,652

UNITED STATES PATENT OFFICE 2,107,652

PROCESS FOR THE PREPARATION OF THE ALKALI METAL SALTS OF 2-BENZOYL-BENZOIC ACID COMPOUNDS

Otto Stallmann, South Milwaukee, Wis., assignor to E. I. du Pont de Nemours & Company, Wilmington, Del., a corporation of Delaware No Drawing. Application August 24, 1936, Serial No. 97,646

3 Claims. (Cl. 260—64)

This invention relates to a process for preparing 2-benzoylbenzoic acid compounds containing salt forming groups in the 4'-position from 4'-chloro-2-benzoylbenzoic acids, and more particularly to an improved process for isolating the reaction products in a simple and economical manner in the form of their alkali metal salts, and in sufficiently pure form that they may be used for many purposes without further purification.

In the preparation of 2-benzoylbenzoic acid compounds which contain salt forming groups in their 4'-positions, such as sulfo, hydroxy or mercapto groups, a 4'-chloro-2-benzoylbenzoic acid is treated in neutral or alkaline solution with an excess of an alkali metal sulfite, hydroxide or sulfide, whereby the 4'-chlorine is replaced by the HSO$_3$—, —OH, or —SH radical. In this reaction one mole of a very soluble inorganic salt is formed which together with the excess alkali metal compound employed to complete the reaction must be separated for the desired 2-benzoylbenzoic acid compound (see U. S. Patents 1,779,221; 1,654,287; 1,654,289 and 1,810,013).

Heretofore this separation has been effected by acidifying the reaction mass with a mineral acid and filtering off the free 4'-substituted-2-benzoylbenzoic acid directly, if it is sufficiently insoluble to be completely precipitated, or by salting and filtering where the free acid is relatively soluble in the acid solution. In the case of 4'-sulfo-2-benzoylbenzoic acid it is necessary to add a large amount of salt to completely precipitate it, with the result that the product contains such a high percent of inorganic salts that it must be further purified before it can be economically converted to 2-anthraquinone-sulfonic acid.

It is therefore an object of this invention to provide an improved process for preparing 2-benzoylbenzoic acids which contain in the 4'-position salt forming groups such as HSO$_3$—, —OH, and —SH, whereby they may be isolated in the form of their alkali metal salts in high yields, directly from the solution in which they are formed.

It is a further object of the invention to provide a process for isolating 4'-sulfo-2-benzoylbenzoic acid in the form of its dialkali metal salt, in high yield, directly from the solution in which it is formed in sufficiently high purity that it can be readily ring-closed in sulfuric acid without further purification.

I have found that aqueous solutions of the dialkali metal salts of 2-benzoylbenzoic acids which contain a salt forming group in the 4'-position, such as a sulfo, hydroxy, or mercapto group, can be evaporated to very concentrated solutions containing up to 40–70% of the benzoylbenzoic acid compound. I have also found that the inorganic salts normally present in the final reaction mass, in the manufacture of such benzoylbenzoic acid alkali metal salts, are only slightly soluble in such a concentrated solution of the benzoylbenzoic acid compounds, and are precipitated therefrom during the concentrating step. This was in fact surprising for it is well known that the alkali metal chlorides and other inorganic alkali metal salts which are present in the reaction are very soluble and are generally employed to precipitate the free acids of these particular benzoylbenzoic acid compounds from solution, as illustrated by the patents above cited.

According to this invention the crude reaction liquor resulting from the treatment of 4'-chloro-2-benzoylbenzoic acid with alkali metal sulfites, hydroxides or sulfides, as more particularly disclosed, for example in U. S. Patents 1,779,221; 1,654,287; 1,654,289 and 1,810,013, is evaporated to a point where the inorganic salts are precipitated out of the solution, while the dialkali metal salts of the 4'-substituted-2-benzoylbenzoic acid remains in solution as a colorless liquid of high viscosity. The solution after filtering may be evaporated to dryness, or the product in this concentrated solution may be used directly for certain purposes.

Where the presence of small amounts of the inorganic salt is not detrimental in the use to which the product is to be put, it will not be necessary to carry the evaporation to a point where all of the inorganic salts are precipitated. Where the solution is concentrated too highly it becomes so viscous that it is difficult to filter, although this difficulty may be overcome by the use of high speed centrifuges. It is sufficient in most cases, however, to evaporate only to a point where the bulk of the most objectionable inorganic salts, such as the alkali metal halides and sulfites, are precipitated.

Evaporation to a point where the solution contains from 40 to 60% 4'-substituted-2-benzoylbenzoic acid has been found to give satisfactory results for all general purposes. The evaporation may be controlled by specific gravity determinations taken at intervals during the course of the evaporation. The evaporation may be carried out under vacuum or by the aid of air or other inert gases being blown over or through the solution at suitable temperatures. The separation of the inorganic salts can be effected by filtering, centrifuging, or where the solution is not too viscous by settling and decantation. Ordinarily the filtration of the mass may be carried out at normal temperatures. However, where a more complete separation is desired and it is necessary to evaporate the mass to a point where due to its high viscosity it filters only with difficulty, higher temperatures may be employed to keep the mass in a more fluid condition, in which case the total solids content of the solution may be brought as high as 80%. The process is also applicable to the isolation of simple substituted 4'-sulfo(hydroxy or mercapto)-2-benzoylbenzoic acid, so long as they have high solubility in the form of their dialkali metal salts in the presence of the inorganic salts.

The following examples are given to more fully illustrate the invention. The parts used are by weight.

Example 1

The crude reaction liquid, obtained by treating the aqueous sodium salt solution containing 100 parts 4'-chloro-benzoylbenzoic acid with an excess of sodium sulfite solution (prepared from 60.2 parts sodium bisulfite and 20.9 parts of flaked caustic soda) in an autoclave at 180° C., according to the procedure described in U. S. Patent 1,779,221, is evaporated at the boiling point of the liquid (100 to 115° C.) until most of the inorganic salts ($NaCl$, $Na_2SO_3$, and $Na_2SO_4$) are precipitated, and the specific gravity of the mass is from 1.3 to 1.4 at 20° C.

The mass is then cooled and centrifuged to remove the precipitated inorganic salts. The clear, colorless filtrate contains the 4'-sulfo-2-benzoylbenzoic acid in the form of the disodium salt. This solution containing from 40 to 60% 4'-sulfo-benzoylbenzoic acid disodium salt may be dried at 100° C. and ring-closed without further purification directly to anthraquinone-2-sodium sulfonate in practically quantitative yields in only 3 parts of 25% oleum.

Example 2

A crude solution of the disodium salt of 4'-hydroxy-benzoylbenzoic acid, obtained by heating 187 parts of 4'-chloro-benzoylbenzoic acid with 80 parts caustic soda in 800 parts water in an autoclave, for 15 hours at 180–185° C., according to the procedure described in U. S. Patent 1,654,289, is evaporated at the boil, until substantially all of the sodium chloride is precipitated out of solution and the total weight of the mass is approximately 400 parts and contains 43% 4'-hydroxy-2-benzoylbenzoic acid. The mass is then filtered at room temperature and the clear, colorless filtrate of high viscosity, thus obtained, contains the disodium salt of 4'-hydroxy-2-benzoylbenzoic acid in solution.

The same method for isolating the dipotassium salt of 4'-hydroxy-2-benzoylbenzoic acid may be employed where potassium hydroxide has been used in place of sodium hydroxide in the above example.

Example 3

3'-nitro-4'-hydroxy-2-benzoylbenzoic acid obtained by boiling 3'-nitro-4'-chloro-2-benzoylbenzoic in dilute caustic, according to the procedure outlined in U. S. Patent 1,654,287, may be isolated as the disodium salt by the procedure outlined in Example 2, the evaporation being carried to a point where the reaction mass contains from 40–50% of the alkali metal salt of 3'-nitro-4'-hydroxy-2-benzoylbenzoic acid, at which point only a small amount of sodium chloride remains in solution.

The 4'-mercapto-2-benzoylbenzoic acid prepared by heating 4'-chloro-2-benzoylbenzoic acid with an excess of sodium sulfite (dilute aqueous solution) at the boil may be freed from most of the sodium chloride formed in the reaction by the same procedure.

I claim:

1. In the process for preparing the dialkali metal salts of 2-benzoylbenzoic acids, which contain in the 4'-position a salt forming group of the class consisting of —$SO_3H$, —OH and —SH, by treatment of a 4'-halogen-2-benzoylbenzoic acid with an alkali metal compound of the class consisting of alkali metal sulfites, alkali metal hydroxides, and alkali metal sulfides, the step which comprises separating the resulting product by concentrating the reaction solution to a point where the major part of the inorganic salts of the alkali metals formed during the reaction are precipitated, and separating the inorganic salts from the solution of the dialkali metal salt of the 4'-substituted 2-benzoylbenzoic acid.

2. In the process for preparing the dialkali metal salts of 4'-sulfo-2-benzoylbenzoic acids wherein 4'-chloro-2-benzoylbenzoic acid is reacted with an alkali metal sulfite, the step which comprises freeing the resulting solution from the major part of the inorganic salts present in the reaction mass, by bringing the concentration of the solution to from 40 to 70% of 4'-sulfo-2-benzoylbenzoic acid, and separating out the inorganic salts which have been precipitated.

3. In the process for preparing the dialkali metal salts of 4'-sulfo-2-benzoylbenzoic acids wherein 4'-chloro-2-benzoylbenzoic acid is reacted with an alkali metal sulfite, the step which comprises freeing the resulting solution from the major part of the inorganic salts present in the reaction mass, by bringing the concentration of the solution to from 40 to 70% of 4'-sulfo-2-benzoylbenzoic acid, separating out the inorganic salts which have been precipitated, and evaporating the remaining solution to dryness.

OTTO STALLMANN.